(12) United States Patent
Holloway et al.

(10) Patent No.: US 9,287,731 B2
(45) Date of Patent: Mar. 15, 2016

(54) BATTERY CHARGING SYSTEM INCLUDING CURRENT OBSERVER CIRCUITRY TO AVOID BATTERY VOLTAGE OVERSHOOT BASED ON BATTERY CURRENT DRAW

(71) Applicant: Fairchild Semiconductor Corporation, San Jose, CA (US)

(72) Inventors: Rendon Holloway, Campbell, CA (US); Qinghung (Michelle) Lee, San Jose, CA (US); Jonathan Klein, Palo Alto, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 361 days.

(21) Appl. No.: 13/774,018

(22) Filed: Feb. 22, 2013

(65) Prior Publication Data

US 2013/0221905 A1    Aug. 29, 2013

Related U.S. Application Data

(60) Provisional application No. 61/604,867, filed on Feb. 29, 2012.

(51) Int. Cl.
*H02J 7/00* (2006.01)
*H02J 7/04* (2006.01)
*H02J 7/24* (2006.01)
*H02J 7/08* (2006.01)

(52) U.S. Cl.
CPC .............. *H02J 7/007* (2013.01); *H02J 7/0054* (2013.01); *H02J 7/0068* (2013.01); *H02J 7/0081* (2013.01); *H02J 7/0083* (2013.01); H02J 7/0093 (2013.01); H02J 7/04 (2013.01); H02J 7/042 (2013.01); H02J 7/045 (2013.01); H02J 7/08 (2013.01); H02J 7/242 (2013.01); H02J 7/245 (2013.01); H02J 2007/0059 (2013.01); Y02E 60/12 (2013.01)

(58) Field of Classification Search
CPC .......... H02J 7/0093; H02J 7/04; H02J 7/042; H02J 7/045; H02J 7/242; H02J 7/245; H02J 7/008; Y02E 60/12
USPC ................................ 320/137, 141, 145, 148
See application file for complete search history.

(56) References Cited

U.S. PATENT DOCUMENTS

| | | | | |
|---|---|---|---|---|
| 5,185,585 A | * | 2/1993 | Newell et al. | 331/46 |
| 5,635,816 A | * | 6/1997 | Welsh et al. | 320/102 |
| 5,777,457 A | * | 7/1998 | Lee | H02J 7/0077 320/137 |
| 8,278,882 B2 | * | 10/2012 | Gotou et al. | 320/163 |
| 2002/0008498 A1 | * | 1/2002 | Tong | 320/141 |

* cited by examiner

*Primary Examiner* — Stacy Whitmore
(74) *Attorney, Agent, or Firm* — Grossman Tucker Perreault & Pfleger PLLC (57) ABSTRACT

According to one aspect of the present disclosure, there is provided a battery charging system. The battery charging system includes battery charging circuitry configured to provide charging current to a battery. The battery charging system further includes feedback circuitry configured to generate a feedback signal indicative of a battery charging condition, wherein the battery charging system is configured to control the battery charging current based on, at least in part, the feedback signal. The battery charging system further includes feed forward circuitry configured to adjust the feedback signal to decrease battery charging current when a decrease in battery current draw exceeds a threshold, and wherein the feed forward circuitry is configured to decrease the battery charging current faster than the feedback circuitry.

20 Claims, 7 Drawing Sheets

BATTERY CHARGING SYSTEM INCLUDING CURRENT OBSERVER CIRCUITRY TO AVOID BATTERY VOLTAGE OVERSHOOT BASED ON BATTERY CURRENT DRAW

CROSS REFERENCE TO RELATED APPLICATIONS

The present application claims the benefit of U.S. Provisional Patent Application Ser. No. 61/604,867, filed Feb. 29, 2012, the entire disclosure of which is incorporated herein by reference.

FIELD

The present disclosure relates to battery chargers, and, more particularly, to current observer circuitry to reduce or eliminate transient battery overvoltage conditions.

BACKGROUND

In a cell phone, the condition can exist where a fully (or nearly so) charged battery is simultaneously connected to both the output of the battery charger and the system load (e.g., RF transmitter, etc.). In this case, the battery will spend most of the time at the charger float voltage. The float voltage will normally be close to the maximum allowable battery voltage established by the battery manufacturer and/or safety standards organizations. If the system suddenly demands a lot of current, the required current will initially be supplied by the battery, due to the limited bandwidth of the charger, and the battery voltage will droop. This droop is not harmful, but when the system load current demand is removed, the battery voltage may overshoot, resulting in a transient battery overvoltage condition. In particular, the TDMA protocol employed in GSM cell phones produces a GPRS pulse train, consisting of (typically) 2 A for 1.15 ms and 0 A for 3.45 ms. Existing battery charger ICs all suffer from significant battery voltage overshoot in response to a GPRS pulse.

In Japan, JEITA specifications provide an example of the motivation for eliminating the overshoot: they prohibit repetitive excursions over 4.40 V for lithium-ion batteries. With tolerance stack-up, overshoot causes customers to program their float voltages lower than they could if there was no overshoot. This margining due to overshoot reduces the amount of charge put into the battery, thereby reducing talk time by as much as 10%.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure describes load current observer circuitry for battery charging systems to reduce or eliminate battery voltage overshoot problems associated with dynamic load power requirements. A sudden, large decrease in the current taken from a battery will generally result in potentially harmful battery voltage overshoot, due to the limited speed at which a negative feedback loop of a conventional battery charging system can react. The load current observer circuitry is a feed forward path that is configured to bypass the slower error amplifier of the feedback loop. The load current observer circuitry consistent with the present disclosure may reduce, or eliminate, the battery voltage overshoot problem associated with GSM cell phones, which may translate into increased talk time and/or more efficient battery utilization.

Figure 1:
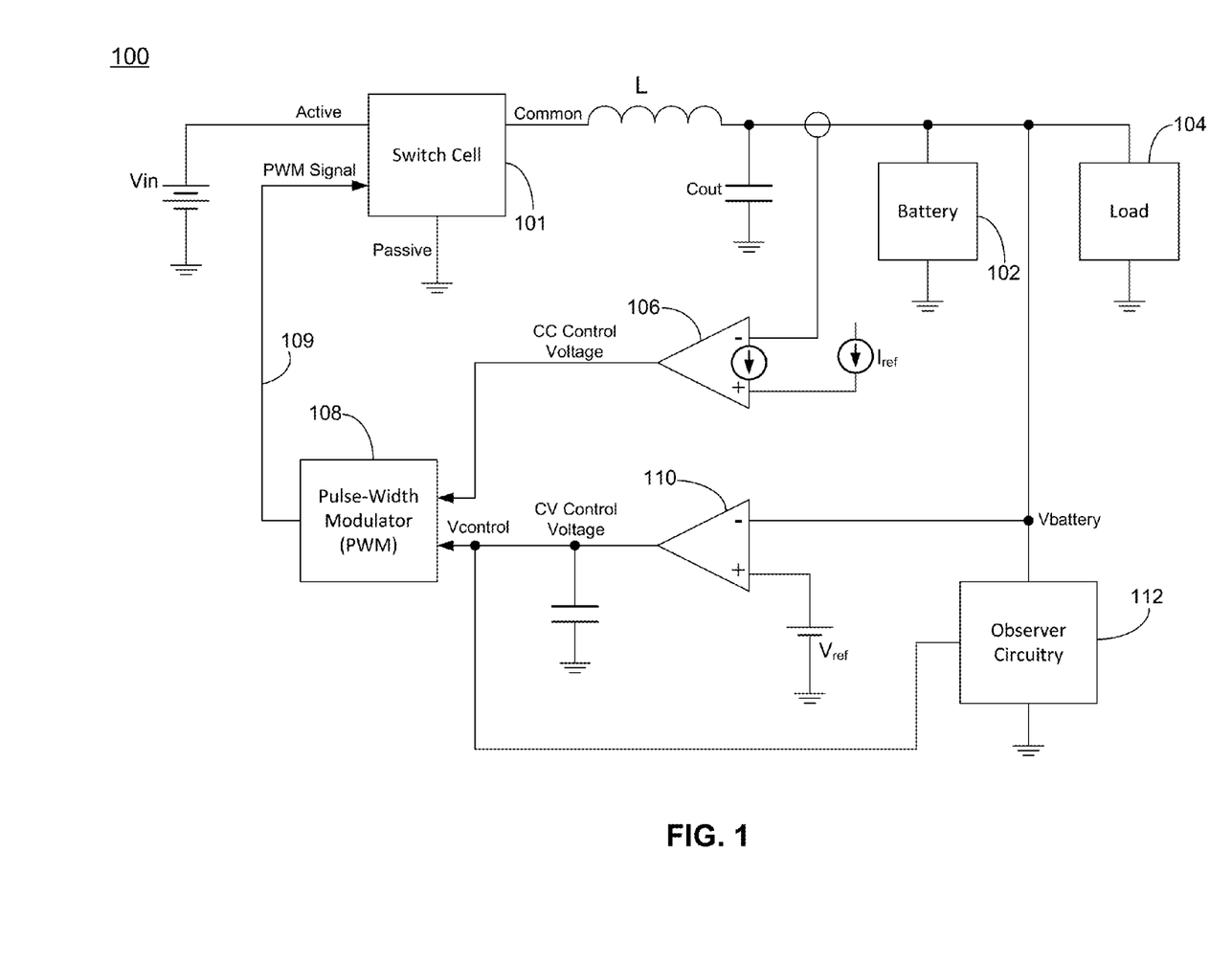
FIG. 1 illustrates a battery charging system consistent with various embodiments of the present disclosure.

FIG. 1 illustrates a battery charger system 100 consistent with various embodiments of the present disclosure. The battery charging system 100 generally illustrates a switched-mode power supply DC-DC converter topology, and generally includes constant current and constant voltage battery charging feedback loops to enable charging of the battery, as generally known and understood by one skilled in the art. The specific topology depicted in FIG. 1 is a Buck converter system that operates to charge a battery 102 and/or provide power to a load 104 from a power source Vin, as is well known. The buck converter includes a switch cell 101 that may include, for example high side and low side switches, as is well known. Pulse width modulator (PWM) controller circuitry 108 is configured to control the switch cell circuitry 101 to controllably deliver power to the load 104 and/or batter 102. The PWM circuitry 108 is configured to generate a PWM signal 109 to control the conduction state of one or more switches of the switch cell circuitry 101, for example, when the PWM signal 109 is High the switch cell 101 couples Vin to the Common terminal to energize the inductor L and when the PWM signal is Low the switch cell 101 couples the Common terminal to the Passive (reference or ground) terminal The constant current feedback loop (represented by a CC error amplifier 106 and reference current (e.g. Iref)) generally operates to provide feedback information to pulse width modulation (PWM) circuitry 108 to controllably deliver battery charging current to the battery 102 throughout most of the charging cycle. As the cell voltage of the battery 102 approaches the reference voltage Vref, the constant voltage feedback loop (represented by a CV error amplifier 110 and the reference voltage (e.g. Vref)) generates a control signal (Vcontrol). The PWM circuitry 108 receives the Vcontrol signal and adjusts the duty cycle of the PWM signal 109 to limit the voltage at the battery 102. As the battery cell voltage continues to rise, charge current decreases, limited by the equivalent series resistance of the battery 102. While the specific example of FIG. 1 is directed to a Buck converter, the embodiments of FIG. 1 may include any switched-mode power supply system such as boost, Buck-boost, flyback, SEPIC, and/or other known or after-developed DC-DC converter topologies.

Figure 2:
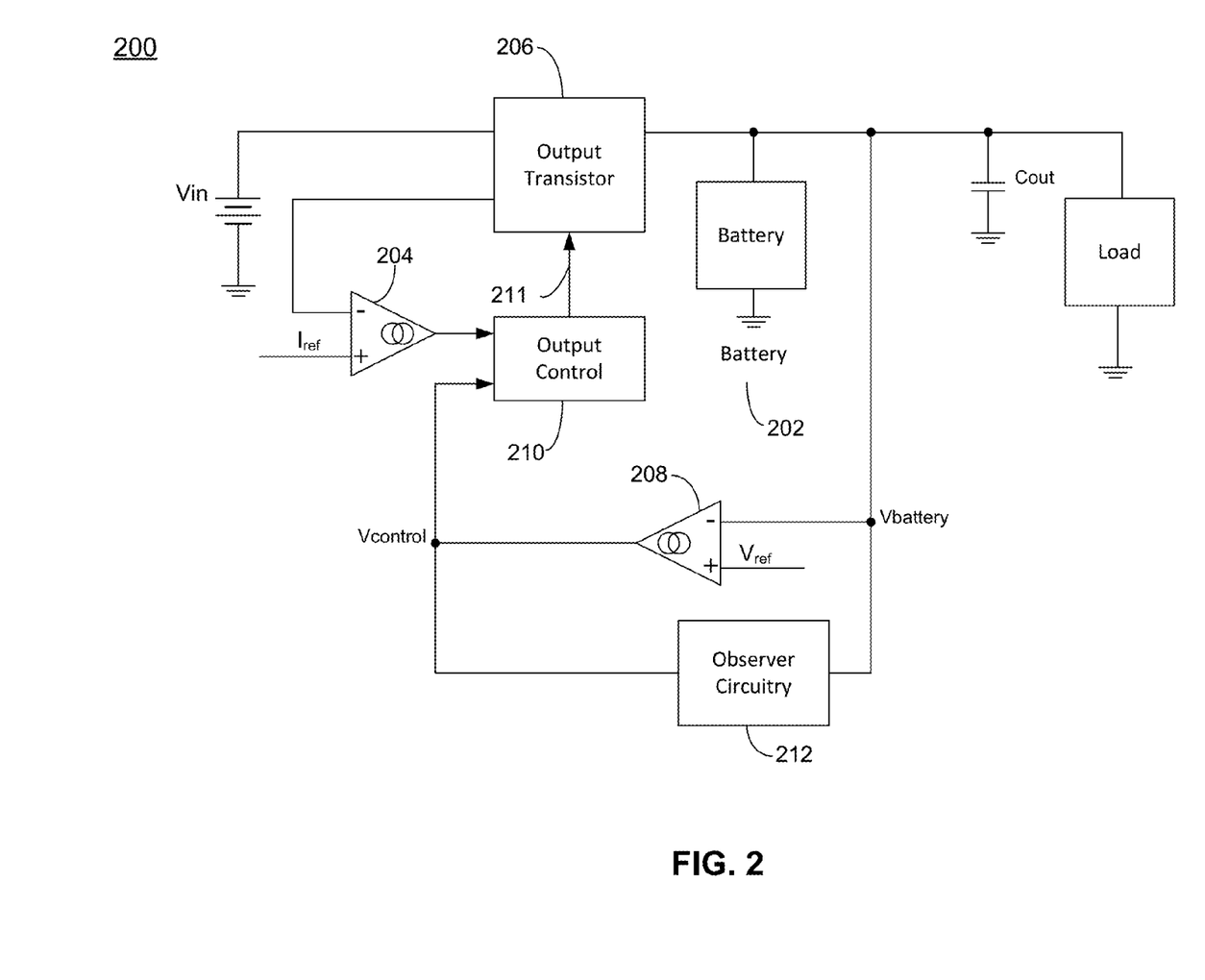
FIG. 2 illustrates another battery charging system consistent with various embodiments of the present disclosure

FIG. 2 illustrates another battery charger system 200 consistent with various embodiments of the present disclosure. The battery charging system 200 generally illustrates a linear regulator power supply (e.g., LDO-type, standard type, etc.), and generally includes current and voltage feedback loops to enable charging of a battery 202, as generally known and understood by one skilled in the art. In this topology, an output transistor 206 is coupled between an input source Vin and the battery 202 and load. Output control circuitry 210 is configured to generate a control signal 211 to control the conduction state of the output transistor 206 to controllably deliver power to the battery 202 and/or the load. The value of the control signal 211 is based on current feedback 204, voltage feedback 208 and/or the observer circuitry 212. The current feedback loop (represented by an error amplifier 204 and reference current (e.g. Iref)) generally operates to provide feedback information to control the conduction state of output transistor circuitry 206 to controllably deliver battery charging current to the battery 202 throughout most of the charging cycle. As cell voltage of the battery 202 nears the float voltage of the charger, the constant voltage feedback loop (represented by an error amplifier 208 and reference voltage (e.g. Vref)) limits the voltage at the Vbattery node. As the cell voltage of the battery 202 continues to rise, charge current decreases, limited by the equivalent series resistance of the battery 202. The current loop 204 of FIG. 2 is analogous to the constant current loop of FIG. 1 and the voltage loop 208 of FIG. 2 is analogous to the constant voltage loop of FIG. 1. Unless specifically stated otherwise, the terms "voltage feedback loop" shall refer herein to both the constant voltage loop of FIG. 1 and the voltage loop of FIG. 2, and the terms "current feedback loop" shall refer herein to both the constant current loop of FIG. 1 and the current loop of FIG. 2.

However, as a general matter, neither of the voltage feedback loops depicted in FIGS. 1 and 2 alone have a fast enough response to prevent voltage spikes on the battery 102, 202 when there is a sudden decrease in the current taken from the battery 102, 202. Accordingly, the present disclosure provides an observer feed-forward path that includes current observer circuitry 112, 212. As shown in FIGS. 1 and 2, the current observer circuitry 112, 212 is coupled between a battery node (Vbattery) and a control node (Vcontrol). As generally illustrated in FIG. 1, the Vcontrol node is the feedback input to the PWM circuitry 108 and, as generally illustrated in FIG. 2, the Vcontrol node is the feedback input to output control circuitry 210. The observer circuitry 112 of system 100 is generally configured to adjust the feedback signal of the Vcontrol node to enable the PWM controller circuitry 108 to quickly adjust the duty cycle of the PWM signal 109 in response to a sudden decrease in battery current draw. Similarly, the observer circuitry 212 of system 200 is generally configured to adjust the feedback signal of the Vcontrol node to enable the output control circuitry 210 to quickly control the output transistor 206 to adjust the power (voltage and/or current) delivered to the load. In general, the observer circuitry 112, 212 is configured to react faster than the voltage feedback loop, thus reducing or eliminating voltage overshoots from the battery charger when there is a sudden decrease in battery current draw.

Figure 3:
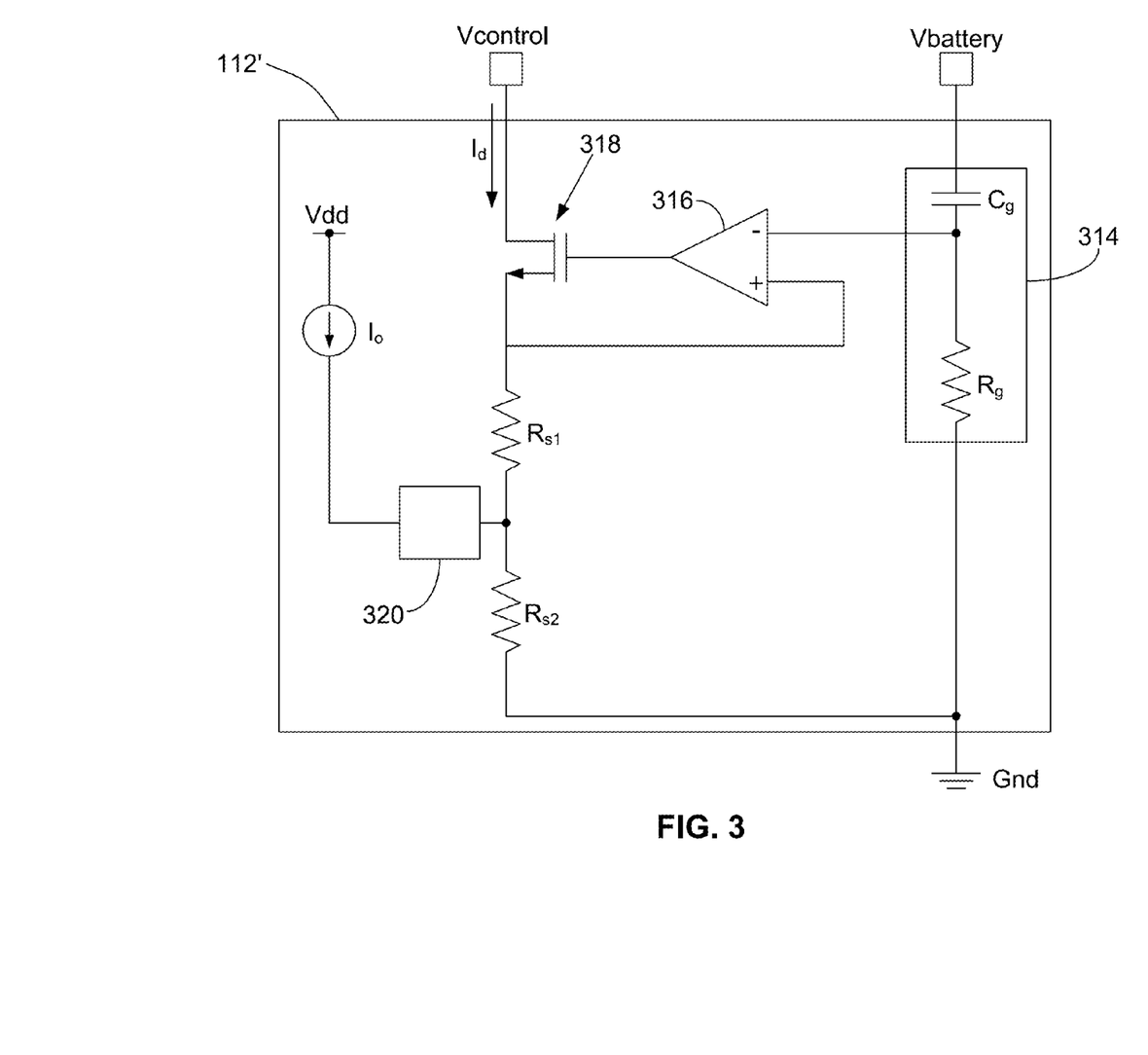
FIG. 3 illustrates current observer circuitry consistent with one embodiment of the present disclosure.

FIG. 3 illustrates current observer circuitry 112' consistent with one embodiment of the present disclosure. The observer circuitry 112' of this embodiment may be used in a switched-mode converter topology of FIG. 1 and/or a linear regular topology of FIG. 2. As shown, the current observer circuitry 112' includes a high-pass filter circuitry (e.g. high-pass R-C filter circuitry 314). The high-pass R-C filter circuitry 314 includes resistor $R_g$ and capacitor $C_g$ in series. The output of the observer circuitry 112' is generated across resistor $R_g$, which therefore has one terminal connected to ground, so as to reference the high-pass R-C filter output signal to ground. As described in greater detail herein, the time constant of the high-pass R-C filter 314 may be selected such that the voltage feedback loop 0-dB crossover frequency is within the passband of the R-C filter 314, which may reduce or eliminate possible effects of the observer circuitry 112' on the voltage feedback loop bandwidth and stability margin.

The time constant of the R-C filter 314 may also be selected such that when the load current decreases beyond a selected threshold, the R-C filter 314 operates in the stopband and acts as a differentiator. More specifically, the R-C filter 314 may be configured to provide an estimate of the change in battery current based on the following Ohm's Law for a capacitor: i=C·dv/dt, where i is the instantaneous current (e.g. amount of current at a specific point in time) through capacitor $C_g$, C is the capacitance in Farads of the capacitor $C_g$, dv/dt is the instantaneous rate of voltage change (volts per second) (e.g. rate of change of voltage at a specific point in time, the same specific point in time that the instantaneous current i is referenced at). In one embodiment, the capacitor $C_g$ may have a capacitance of 20 pF and resistor $R_g$ may have a resistance of 5M.

When the observer circuitry 112' is active, the high-pass R-C filter 314 is configured to operate in the stopband, and thus, the output signal of the high-pass R-C filter 314 will be relatively small. Therefore, the observer circuitry 112' of this embodiment is also configured to add gain to the output of the R-C filter 314. The operational amplifier 316 is configured to function as a buffer and voltage amplifier and a transistor 318 provides the signal power gain and performs a voltage-to-current conversion. In the illustrated embodiment, the transistor 318 is an N-channel metal oxide semiconductor field effect transistor (MOSFET). The amount of required gain may be based on, for example, the particular circuit parameters of the battery charging system and/or the operational constraints of the observer circuitry 112', described above. As a general matter, the gain may be set by the sum of the resistances of resistor $R_{s1}$ and resistor $R_{s2}$. In one embodiment, resistor $R_{s1}$ may have a resistance of 11.11KΩ and resistor $R_{s2}$ may have a resistance of 22.22KΩ.

The observer circuitry 112' may also include offset circuitry 320 configured to prevent the observer circuitry 112' from being activated by minor fluctuations in battery current associated with normal operation of the battery charger system. The amount of offset may be based on, for example, the particular circuit parameters of the battery charging system and/or the operational constraints of the observer circuitry 112', described above. The "normal" battery current fluctuation range may be dependent upon the type of load that is coupled to the system. For example, approximately 250 mA battery current fluctuations may occur during normal operation when the load is a central processing unit, the graphics processor, the liquid crystal display, and the audio amplifier, etc. Of course, in other embodiments, the "normal" allowable fluctuations may be different, as may be identified by one of ordinary skill in the art. As a general matter, the offset may be determined by the following formula: Voffset=$I_o$·$R_{s2}$. In one embodiment, Io may have a value of 500 nA, such that Voffset would be 11.11 mV (500 nA×22.2 KΩ).

As such, the observer circuitry 112' is configured to activate in response to a sudden large reduction in battery current. The observer circuitry 112' is further configured to operate in unipolar fashion, i.e., as a current sink, to pull down on the control voltage, thereby resulting in a near instantaneous reduction of the switching converter duty cycle of FIG. 1 or the base or gate drive of the output transistor 206 of FIG. 2, resulting in a reduction in the battery voltage overshoot.

In operation, and assuming a sudden, large decrease in battery current draw, the observer circuitry 112' receives a voltage signal indicative of, and proportional to, the change in current flowing into the positive terminal of the battery, which is connected to the Vbattery node. This voltage signal is applied to the non-inverting input of the operational amplifier 316. The offset circuitry 320 is configured to raise the inverting input of the operational amplifier 316 to a reference potential that is above the ground potential. Therefore, if ΔVbattery<Voffset (where the symbol Δ indicates increment or change), the MOSFET 318 will remain non-conducting (open). If ΔVbattery>Voffset, the MOSFET 318 conducts (turns on) and $I_d$ (drain current) begins to flow. The resulting drain current $I_d$ pulls down the control voltage on the control node. In the topology of FIG. 1, this may cause the PWM circuitry 108 to reduce the duty cycle of a PWM control signal 109, thereby reducing the output of the battery charger. In the topology of FIG. 2, this may cause the output control circuitry 210 to control the conduction state of the output transistor 206 to reduce the amplitude of the control signal 211, thereby reducing the output of the battery charger.

Figure 4:
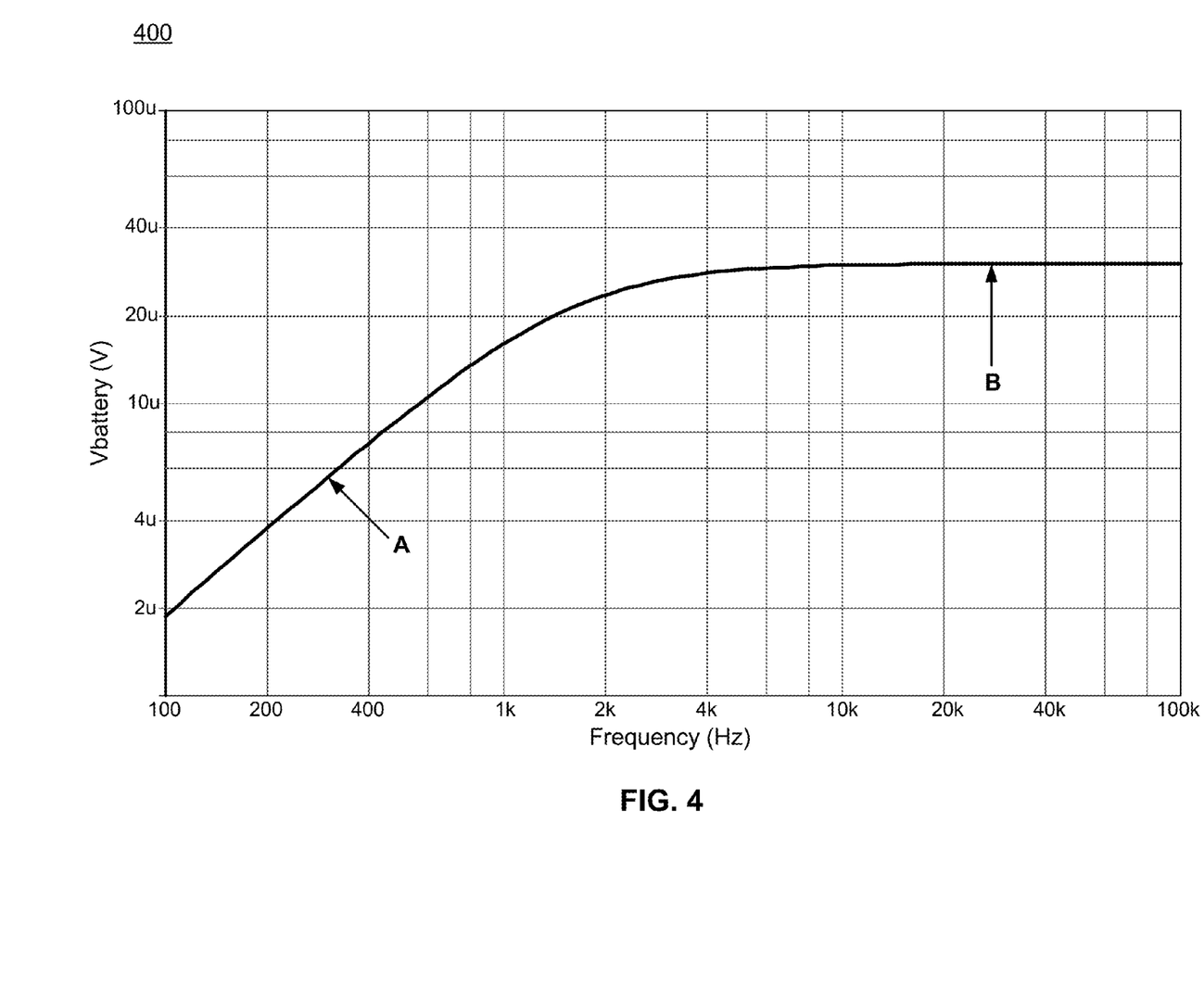
FIG. 4 illustrates a Bode plot of the current observer circuitry of FIG. 3.

FIG. 4 illustrates a Bode plot 400 of the current observer circuitry 112' of FIG. 3. In particular, the Bode plot 400 depicts the transfer function of Vbattery (battery voltage) to current drain $I_d$ of the observer circuitry 112'. The observer circuitry 112' is configured to operate as a high pass filter during large battery current draw events. As indicated by arrow A, the observer circuitry 112' is configured to operate during a major system load/release event (high pass filter stopband). The 0-dB crossover point of the constant voltage feedback loop is within the passband of the high pass filter, as indicated by arrow B.

The example observer circuitry 112' described above generally operates to sink current from the Vcontrol node to adjust power output. It should be understood by those skilled in the art that in other embodiments the observer circuitry 112 may be configured to source current to the Vcontrol node. For example, the PWM circuitry 108 and/or output control circuitry 210 may be configured to decrease the duty cycle of the PWM signal 109 or decrease the amplitude of the control signal 211, respectively, when there is an increase of voltage or current at the Vcontrol node. Thus, the term "adjust", as used herein in the context of the feedback signal of the voltage control node, may be either a source operation (Vcontrol is adjusted upward) or a sink operation (Vcontrol is adjusted downward).

Figure 5A:
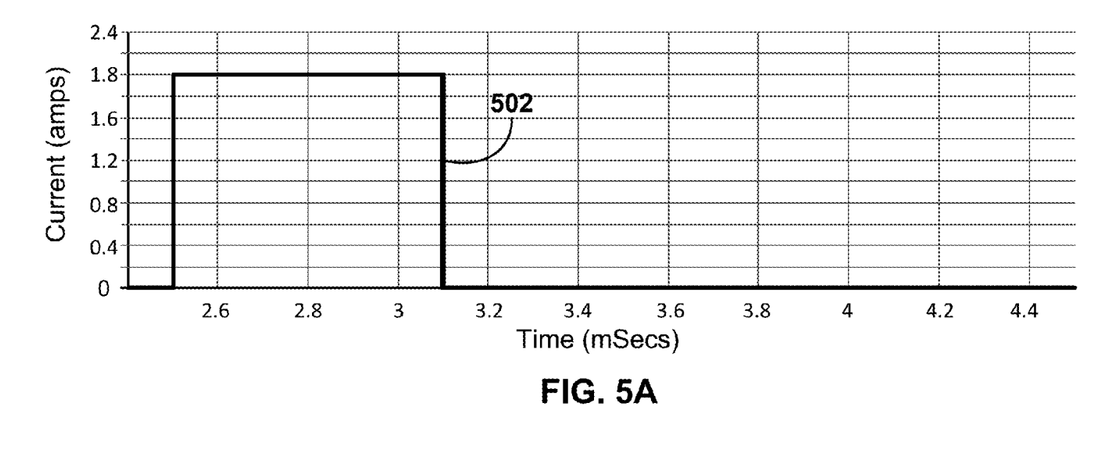
FIGS. 5A and 5B illustrate current and voltage response curves of a conventional battery charging system and the battery charging system of FIG. 1.
Figure 5B:
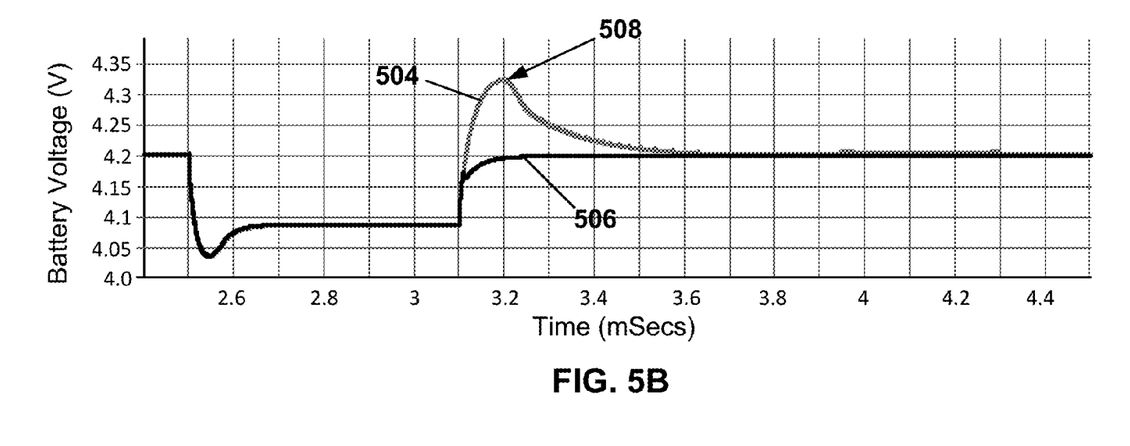

FIG. 5A illustrates a current a typical current pulse (GPRS 2-A) 502 in a GSM cell phone. FIG. 5B illustrates voltage response curves 504, 506 of a conventional battery charging system and the battery charging system of FIG. 1, respectively. As shown, curve 504 represents a typical voltage response curve of a conventional battery charging system. When the current pulse 502 of FIG. 5A drops to 0, there is a large voltage overshoot, as indicated by arrow 508 in the voltage response curve 504 of the conventional battery charging system. The voltage overshoot indicates that the response of the conventional battery charger is too slow to react to the sudden decrease in load current, thus causing a large voltage overshoot to the battery. Curve 506 represents the voltage response of the battery charging system 100 depicted in FIG. 1. As shown, when the current pulse 502 of FIG. 5A drops to 0, the observer circuitry 112 is configured to operate to ensure that the voltage overshoot is reduced or eliminated.

Figure 6:
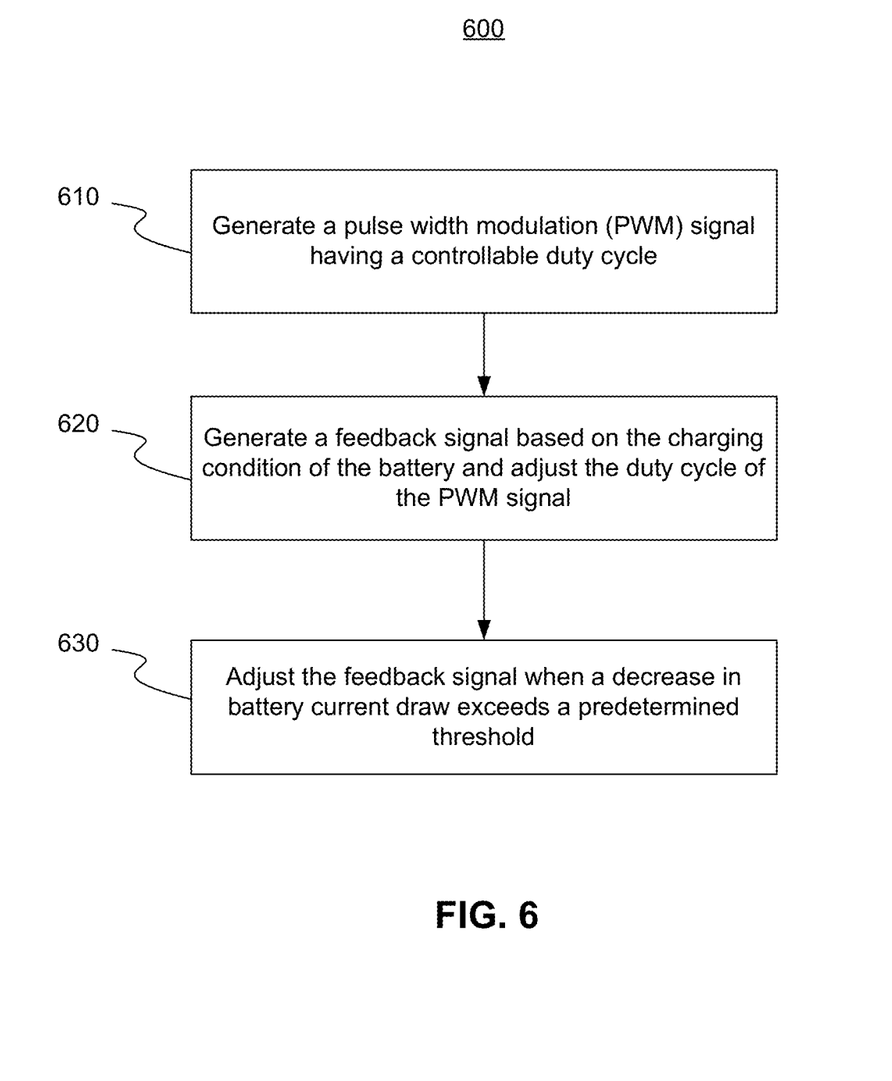
FIG. 6 illustrates a flowchart of operations of one exemplary embodiment consistent with the present disclosure.

FIG. 6 illustrates a flowchart of operations 600 of one exemplary embodiment consistent with the present disclosure. At operation 610, a pulse width modulation (PWM) signal having a controllable duty cycle is generated. The PWM signal is configured to control a battery charging current and voltage. At operation 620, a feedback signal based on a battery charging condition is generated and the duty cycle of the PWM signal is adjusted based on the feedback signal. At operation 630, the feedback signal is adjusted when a decrease in battery current draw exceeds a predetermined threshold. In one embodiment, adjustment of the feedback signal causes an adjustment of the duty cycle of the PWM signal more quickly than the feedback signal alone.

Figure 7:
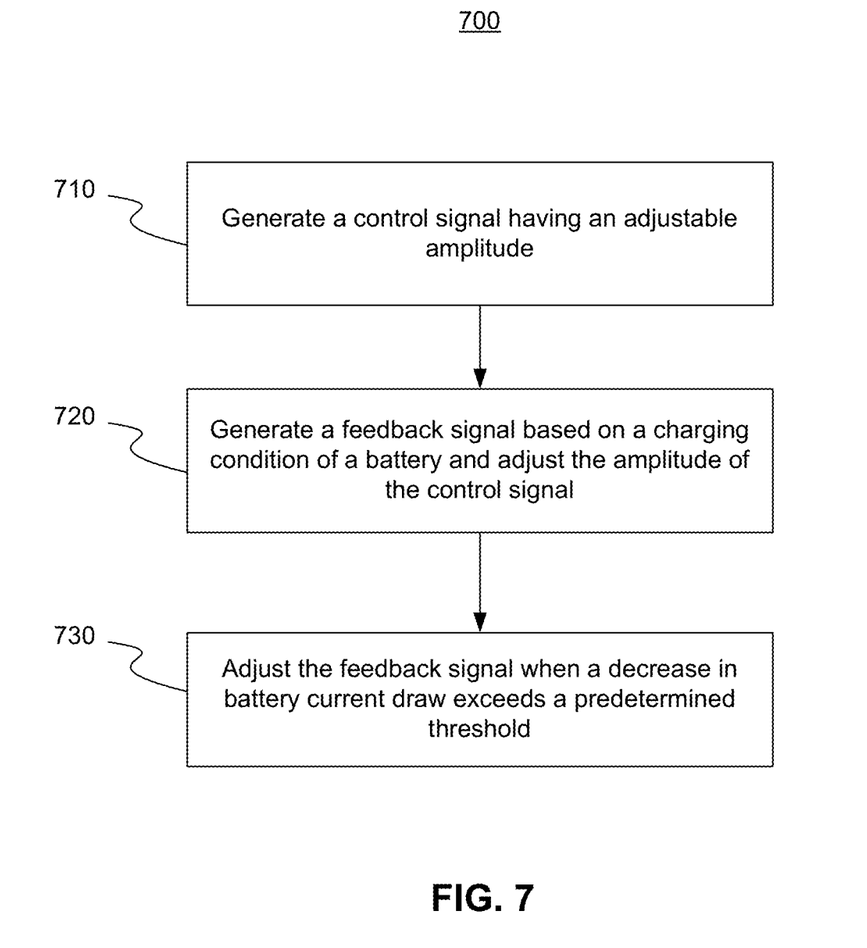
FIG. 7 illustrates a flowchart of operations of another exemplary embodiment consistent with the present disclosure.

FIG. 7 illustrates a flowchart of operations 700 of another exemplary embodiment consistent with the present disclosure. At operation 710, a control signal to control the conduction state of an output transistor is generated. The control signal is configured to control a battery charging current and voltage. At operation 720, a feedback signal based on a battery charging condition is generated and the amplitude of the control signal is adjusted based on the feedback signal. At operation 730, the feedback signal is adjusted when a decrease in battery current draw exceeds a predetermined threshold. In one embodiment, adjustment of the feedback signal causes an adjustment to the control signal more quickly than the feedback signal alone.

While FIGS. 6 and 7 illustrate method operations according various embodiments, it is to be understood that in any embodiment not all of these operations are necessary. Indeed, it is fully contemplated herein that in other embodiments of the present disclosure, the operations depicted in FIGS. 6 and 7 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

According to one aspect of the present disclosure, there is provided a battery charging system. The battery charging system includes pulse width modulation (PWM) circuitry configured to generate a PWM signal having a controllable duty cycle. The PWM signal is configured to control a battery charging current and voltage. The battery charging system further includes voltage feedback circuitry configured to generate a feedback signal to the PWM circuitry based on a battery charging condition. The PWM circuitry is further configured to adjust the duty cycle of the PWM signal based on the feedback signal. The battery charging system further includes current monitoring circuitry configured to adjust the feedback signal when a decrease in battery current draw exceeds a predetermined threshold. The current monitoring circuitry is configured to adjust the duty cycle of the PWM signal faster than the voltage feedback circuitry.

According to another aspect of the present disclosure, there is provided a battery charging system. The battery charging system includes output control circuitry configured to generate a control signal to control the conduction state of an output transistor. The control signal is configured to control a battery charging current and voltage. The battery charging system further includes voltage loop circuitry configured to generate a feedback signal to the output control circuitry based on a battery charging condition. The output control circuitry is further configured to adjust the control signal based on the feedback signal. The battery charging system further includes current monitoring circuitry configured to adjust the feedback signal when a decrease in battery current draw exceeds a predetermined threshold. The output circuitry is configured to adjust the control signal faster than the voltage loop circuitry.

According to another aspect of the present disclosure, there is provided a battery charging system. The battery charging system includes battery charging circuitry configured to provide charging current and voltage to a battery system. The battery charging system further includes feedback circuitry configured to generate a feedback signal indicative of a battery charging condition, wherein the battery charging system is configured to control the battery charging current and voltage based on, at least in part, the feedback signal. The battery charging system further includes feed forward circuitry configured to adjust the feedback signal to decrease battery current and voltage when a decrease in battery current draw exceeds a threshold, and wherein the feed forward circuitry is configured to decrease the battery current and voltage faster than the feedback circuitry.

According to another aspect of the present disclosure, there is provided a method of controlling a switched-mode power supply to control battery charging current and voltage. The method includes generating a pulse width modulation (PWM) signal having a controllable duty cycle. The PWM signal is configured to control a battery charging current and voltage. The method further includes generating a feedback signal based on a battery charging condition and adjusting the duty cycle of the PWM signal based on the feedback signal. The method further includes sinking current from the feedback signal when a decrease in battery current draw exceeds a predetermined threshold. The current sink causes an adjustment to the duty cycle of the PWM signal faster than the feedback signal alone.

According to another aspect of the present disclosure, there is provided a method of controlling a linear-mode power supply to control battery charging current and voltage. The method includes generating a control signal to control the conduction state of an output transistor. The control signal is configured to control a battery charging current and voltage. The method further includes generating a feedback signal based on a battery charging condition and adjusting the amplitude of the control signal based on the feedback signal. The method further includes sinking current from the feedback signal when a decrease in battery current draw exceeds a predetermined threshold. The current sink causes an adjustment to the control signal faster than the feedback signal alone.

According to another aspect of the present disclosure, there is provided at least one computer accessible medium having instructions stored thereon. When executed by one or more processors, the instructions may cause a computer system to perform operations for controlling battery charging current and voltage. The operations include generating a pulse width modulation (PWM) signal having a controllable duty cycle. The PWM signal is configured to control a battery charging current and voltage. The operations further include generating a feedback signal based on a battery charging condition and adjusting the duty cycle of the PWM signal based on the feedback signal. The operations further include sinking current from the feedback signal when a decrease in battery current draw exceeds a predetermined threshold. The current sink causes an adjustment to the duty cycle of the PWM signal faster than the feedback signal alone.

Certain embodiments described herein may be implemented in a system that includes one or more machine-readable storage mediums having stored thereon, individually or in combination, instructions that when executed by one or more processors perform the methods and/or operations described herein. Here, the processor may include, for example, a system CPU (e.g., core processor) and/or programmable circuitry. Thus, it is intended that operations according to the methods described herein may be distributed across a plurality of physical devices, such as processing structures at several different physical locations.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

"Circuitry" or "circuit", as used in any embodiment herein, may include, for example, singly or in any combination, hardwired circuitry, programmable circuitry, state machine circuitry, firmware that stores instructions executed by programmable circuitry and/or circuitry available in a larger system, for example, discrete elements that may be included as part of an integrated circuit. In addition, any of the switch devices described herein may include any type of known or after-developed switch circuitry such as, for example, MOS transistors, BJT, SiC, etc.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A battery charging system, comprising:
   pulse width modulation (PWM) circuitry configured to generate a PWM signal having a controllable duty cycle, said PWM signal being configured to control a battery charging power;
   voltage feedback loop circuitry configured to generate a feedback signal to said PWM circuitry based on a battery charging condition, wherein said PWM circuitry is further configured to adjust said duty cycle of said PWM signal based on said feedback signal; and
   current monitoring circuitry configured to adjust said feedback signal when a decrease in battery current draw exceeds a predetermined threshold, wherein the current monitoring circuitry is configured to adjust the duty cycle of the PWM signal faster than the voltage feedback circuitry.

2. The battery charging system of claim 1, wherein said current monitoring circuitry comprises high-pass filter circuitry.

3. The battery charging system of claim 2, wherein said high-pass filter circuitry comprises a resistor R and capacitor C arranged in series.

4. The battery charging system of claim 3, wherein an RC time constant of said high-pass filter circuitry is selected such that a 0-dB crossover of said constant voltage control loop circuitry is within a passband of said high-pass filter circuitry.

5. The battery charging system of claim 3, wherein an RC time constant of said high-pass filter circuitry is selected such that said high-pass filter circuitry operates as a differentiator in a stopband of said high-pass filter circuitry when a load current decreases below a predetermined threshold.

6. The battery charging system of claim 2, wherein said high-pass filter circuitry is configured to operate in a stopband of said high-pass filter circuitry.

7. The battery charging system of claim 2, further comprising:
   an operational amplifier coupled to said high-pass filter circuitry and configured to operate as a buffer and voltage amplifier of a signal receive from said high-pass filter circuitry; and
   a transistor coupled to said high-pass filter circuitry and configured to provide signal power gain and perform voltage-to-current conversion of a signal received from said high-pass filter circuitry.

8. The battery charging system of claim 1, wherein said current monitoring circuitry comprises offset circuitry configured to prevent said current monitoring circuitry from being activated by fluctuations in battery current associated with normal operation of said battery charging system.

9. A battery charging system, comprising:
   output control circuitry configured to generate a control signal to control the conduction state of an output transistor, wherein the control signal is configured to control a battery charging power;
   voltage loop circuitry configured to generate a feedback signal to the output control circuitry based on a battery charging condition and adjust the control signal based on the feedback signal; and
   current monitoring circuitry configured to adjust the feedback signal when a decrease in battery current draw exceeds a predetermined threshold, wherein the output circuitry is configured to adjust the control signal faster than the voltage loop circuitry.

10. The battery charging system of claim 9, wherein said current monitoring circuitry comprises high-pass filter circuitry.

11. The battery charging system of claim 10, wherein said high-pass filter circuitry comprises a resistor R and capacitor C arranged in series.

12. The battery charging system of claim 11, wherein an RC time constant of said high-pass filter circuitry is selected such that a 0-dB crossover of said constant voltage control loop circuitry is within a passband of said high-pass filter circuitry.

13. The battery charging system of claim 11, wherein an RC time constant of said high-pass filter circuitry is selected such that said high-pass filter circuitry operates as a differentiator in a stopband of said high-pass filter circuitry when a load current decreases below a predetermined threshold.

14. The battery charging system of claim 10, wherein said high-pass filter circuitry is configured to operate in a stopband of said high-pass filter circuitry.

15. The battery charging system of claim 10, further comprising:
   an operational amplifier coupled to said high-pass filter circuitry and configured to operate as a buffer and voltage amplifier of a signal receive from said high-pass filter circuitry; and
   a transistor coupled to said high-pass filter circuitry and configured to provide signal power gain and perform voltage-to-current conversion of a signal received from said high-pass filter circuitry.

16. The battery charging system of claim 9, wherein said current monitoring circuitry comprises offset circuitry configured to prevent said current monitoring circuitry from being activated by fluctuations in battery current associated with normal operation of said battery charging system.

17. A battery charging system, comprising:
   battery charging circuitry configured to provide charging current to a battery;
   feedback circuitry configured to generate a feedback signal indicative of a battery charging condition, wherein the battery charging circuitry is configured to control the battery charging current based on, at least in part, the feedback signal;
   feed forward circuitry configured to adjust the feedback signal to decrease the battery current when a decrease in battery current draw exceeds a threshold, and wherein the feed forward circuitry is further configured to decrease the battery current faster than the feedback circuitry.

18. The battery charging system of claim 17, wherein the battery charging circuitry is a switched mode power supply.

19. The battery charging system of claim 17, wherein the battery charging circuitry is a linear regulator power supply.

20. The battery charging system of claim 17, wherein feed forward circuitry is configured to prevent adjustment of the feedback signal when the battery current is with a predefined range.

* * * * *